W. H. BELL, Jr.
SYSTEM FOR INDICATING ORDERS AND RECORDING DELIVERIES.
APPLICATION FILED APR. 1, 1912.
1,056,488.
Patented Mar. 18, 1913.
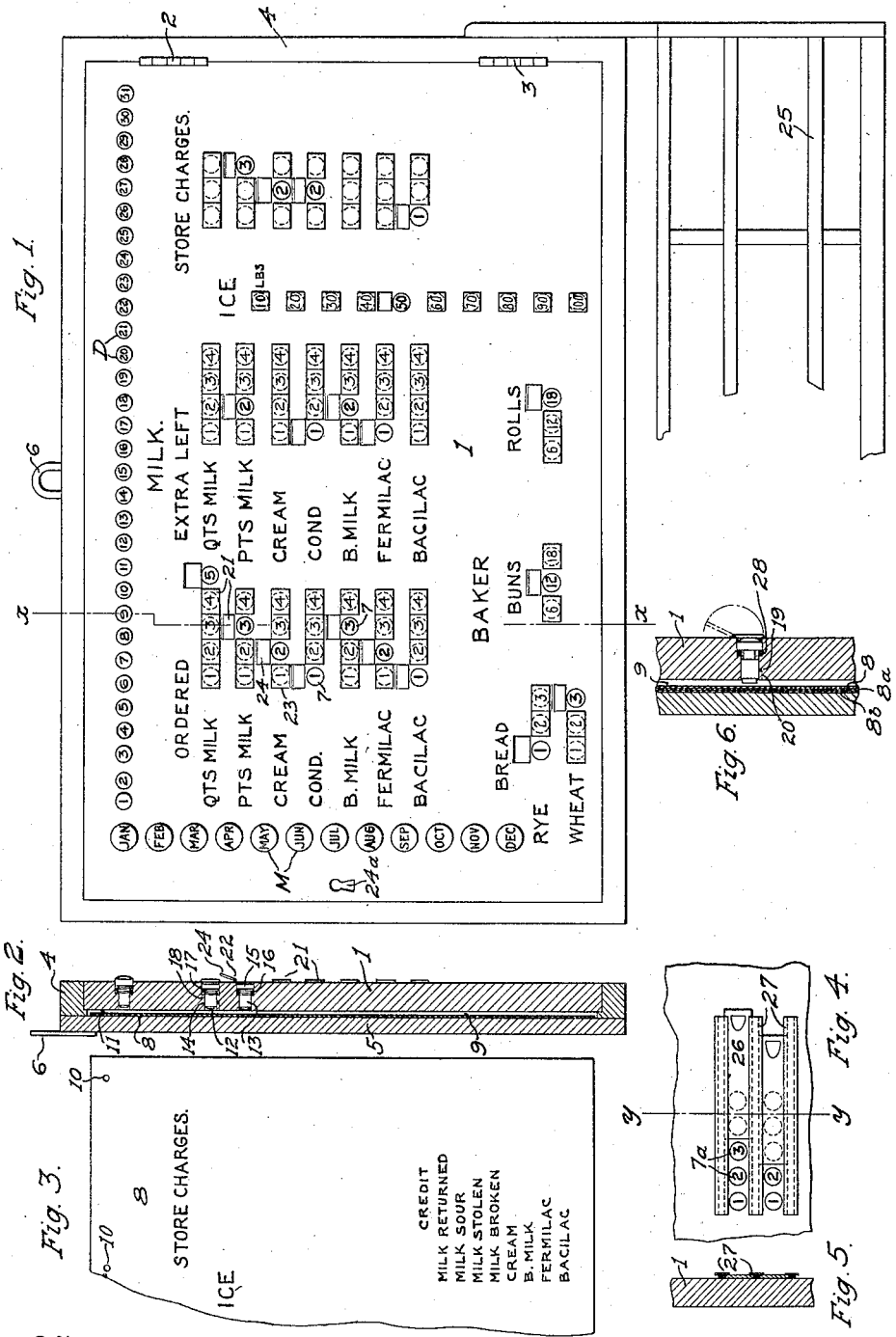

UNITED STATES PATENT OFFICE.

WILLIAM HENRY BELL, JR., OF MOUNT VERNON, NEW YORK.

SYSTEM FOR INDICATING ORDERS AND RECORDING DELIVERIES.

1,056,488.

Specification of Letters Patent.   Patented Mar. 18, 1913.

Application filed April 1, 1912.   Serial No. 687,944.

*To all whom it may concern:*

Be it known that I, WILLIAM H. BELL, Jr., a citizen of the United States, and resident of the city of Mount Vernon, in the county of Westchester and State of New York, have invented certain new and useful Improvements in Systems for Indicating Orders and Recording Deliveries, of which the following is a specification.

This invention relates to a system for indicating orders and recording deliveries.

A certain class of merchants, such as milk dealers, grocers, bakers, ice dealers, etc., are required to deliver their goods in the early morning hours, while their customers are still asleep, or are absent for some other reason. Orders for such goods are usually arranged the evening before; and it has been customary to write down the same on slips of paper, one of which was placed in one of the empty returned bottles for the milk dealer's attention, and the other slips were left in receptacles for the other dealers. Said dealers filled the orders accordingly while making their rounds of delivery, leaving goods at the customer's premises, as stated on the slips found. Considerable discomfort and loss of time was caused to the deliverers of the goods in this way, as they had to hunt for the order slips, and particularly to the milk dealers who had to reach within one of the bottles to extract the slip, sometimes cutting their hands in this way, and by the dim light of their lamps had to decipher the matter on such slips, which matter was often poorly written and unintelligible. At times, discrepancies occurred between the customer's and merchant's claims as to goods ordered and delivered, due to misunderstandings or fradulent intention on the part of the merchant, his agent, or the customer; thereby causing friction between them, mixed up accounts, and loss of trade, payments of bills, time, etc. Many other objections are found at present in the ways of indicating orders and accounting deliveries in this class of business, but which are thought too numerous to mention.

The principal object of my invention is to provide a system that will avoid the aforesaid objectionable difficulties and losses.

Another object of my invention is to provide means that may be set by the customer to indicate the items of goods and amounts thereof ordered, and means whereby the deliverer of the goods can record the items and amounts thereof delivered.

In carrying out my invention, I provide an indicating and recording board upon which are printed grouped columns of items of goods, under proper headings, supplied by one or more dealers. Opposite each of said items are alined suitable registering devices or buttons upon which are printed the various amounts of such items. A facsimile sheet of said board is placed by the customer at the rear thereof, and preferably locked, so that when said buttons are pressed, corresponding amounts of items are recorded upon said sheet opposite the corresponding facsimile item thereon. Shutters normally cover the buttons; and to indicate the order, the customer uncovers certain buttons which indicate the items and amounts thereof desired. The deliverer of the goods fills the order accordingly and presses the exposed buttons, which records upon said sheet the items and amounts delivered. Means are provided for recording on two facsimile sheets at once, so that one copy may serve as a duplicate record for the merchant's use. Thus, the orders are properly and conveniently indicated by the customer and accurate records of deliveries made which are kept by the customer and merchant, on the basis of which payments are rendered, whereby all the aforesaid objections as well as many others are avoided.

Other objects and advantages will hereinafter appear.

In the accompanying drawings, Figure 1 is a general front elevation of the indicating and recording board. Fig. 2 is a sectional side view of Fig. 1, taken on the line *x—x*. Fig. 3 shows a fragment of the right hand side of the facsimile sheet. Fig. 4 is a fragmentary view showing one modification of the shutters for the registering devices. Fig. 5 is a sectional side view of Fig. 4, taken on the line *y—y*. Fig. 6 is a sectional view showing a modification of the registering devices.

An indicating and recording board 1 is hinged at 2, 3 to a frame 4 having a back 5; and the whole may be suspended by the hanger 6 against a wall at some convenient place of the customer's premises and accessible to deliverers of the goods at the early morning hours or in the absence of the customer. Upon board 1 are printed groups of columns of items as shown, supplied by one or more merchants, and opposite each of said items are alined registers or registering buttons 7, each of which is marked with a certain amount of the item. A printed facsimile sheet 8 of said board bearing similar inscriptions of items, as well as other necessary matter, is placed in the narrow space 9 provided between the registering board 1 and the back 5, and is properly lined up by means of holes 10 fitting over pins 11 fixed to the back 5, whereby every item on said sheet is directly opposite its similar item on said board. The buttons 7 have inked type or stenciling stamps 12 at their inner ends similar to the numerals or amounts marked upon the face of the buttons, so that when pressed, such amounts are imprinted upon facsimile sheets 8. Said registering buttons 7, as shown here, pass through the board, and consist of shanks 13 fitting in holes 14, button heads 15 seating in counterbored portions 16, and springs 17 between said heads and shoulders 18 of portions 16 normally pressing said buttons outward. Pins 19 on shanks 13 sliding in slots 20 in said board prevent the buttons from sliding too far outward. Shutters or covers 21 provided for each of said buttons, and being similarly marked, have spring hinges 22 over the buttons, whereby they may be swung to cover and conceal the buttons as shown at 23, or to open and expose the buttons as shown at 24. Normally, the covers 21 are thrown to cover and conceal the buttons 7, and the customer on the evening before delivery or in any contemplated absence, places the sheet 8 in frame 4 and locks it securely by locking the board to frame 4 at 24ª, and then indicates the order upon said board by opening certain covers 21 as shown in Fig. 1. For example, the board being set as shown in Fig. 1 would indicate to the milk dealer the order of 5 quarts milk, 3 pints milk, 2 bottles cream, etc.; and it will be readily seen that the baker, ice dealer, and others may have their order indicated in a similar manner, as shown in the drawing. The deliverer of the goods fills his order as indicated on the board and then presses each of the exposed buttons, which records opposite each item upon the locked facsimile sheet, or upon two sheets in case a duplicate is desired, exactly what has been delivered, and a record is thus made which when filed, after being unlocked, by the customer and by the dealer serves as a basis of payments to the dealers. All frauds and irregularities of charges are thereby prevented and friction between customers and merchants precluded. Buttons of column M indicating the month and of column D the day of the month, may be pressed to register the date of delivery. As a different sheet must be used every day, it may be desirable to have the date printed on the facsimile sheet, or said sheets may be numbered, in which case these buttons may be dispensed with. For the milk dealer, who usually makes a second trip, a column is provided for indicating an extra order, which he may fill and record accordingly; and as he usually interviews the customer at this trip, a special credit column is provided on the facsimile sheet, shown in Fig. 3, whereon he may note any returned, impaired, or stolen goods, which should be credited to the customer and deducted from the bills charged. The column marked "Store charges" serves for recording goods which were ordered still later at the store and delivered specially. It will be evident that with this system provisions may be made on the indicating and recording board that will suit for other classes of merchandise and merchants than those indicated, and provisions may be made for indicating and recording other desired records concerning orders and deliveries of goods.

A rack or stand 25 is preferably fixed to frame 4, whereon may be left all empty bottles, jars, and receptacles to be returned to the dealer, so that same may be found readily when he makes deliveries.

In Figs. 4, 5 is shown a modified form of indicating the order, wherein slides 26 in guiding ways 27 substitute the covers 21, whereby when the slide is shifted to the right the buttons 7ª are exposed, in which case the exposed button bearing the largest amount indicates the desired order.

In Fig. 6 is shown a modified construction of the registering buttons wherein a rubber washer 28 substitutes the spring 17. Said rubber is compressed when recording and is resilient enough to restore the button to normal position. This figure also shows one manner of making a duplicate record for the merchant's use, which consists of placing a carbon sheet 8ª between the two facsimile sheets 8 and 8ᵇ.

Variations may be resorted to within the scope of the invention and portions of the improvements may be used without others.

Having thus described my invention, I claim:

1. In a system for indicating orders and recording deliveries, a board having a list of items of goods thereon, registering devices opposite each of said items representing amounts thereof, means for indicating amounts of said goods ordered, said board adapted to have a facsimile sheet at the rear thereof, and said registering devices adapted to be manipulated to record upon said sheet the amounts of said goods delivered.

2. In a system for indicating orders and recording deliveries, a board having columns of items thereon, registering buttons indicating amounts opposite each of said items, registering buttons indicating dates and months, shutters normally covering said former buttons, said shutters being set to uncover certain buttons to indicate items and amounts ordered, a locked receptacle adapted to receive a facsimile sheet at the rear of said board, and said registering buttons adapted to be pressed to record upon said sheet the items and amounts delivered and the date of delivery.

3. In a system for indicating orders and recording deliveries, a board having lists of items thereon, registering buttons indicating amounts opposite each of said items, shutters normally covering said buttons, said shutters being set to uncover certain buttons to indicate items and amounts ordered, said board having locked means adapted to receive a facsimile sheet at the rear thereof, and said registering buttons adapted to be pressed to record upon said sheet the items and amounts delivered.

4. In a system of the class described, a board having a list of items of goods thereon, registering devices for each of said items, means for indicating amounts of said goods ordered, said board adapted to have a sheet at the rear thereof, and said registering devices adapted to be manipulated separately to record upon said sheet the amounts of said goods delivered.

5. In a system for indicating orders and recording deliveries, a board having a list of items thereon, registering devices indicating amounts opposite each of said items, covers concealing said devices normally, certain of said devices being uncovered to indicate amounts of items ordered, said board adapted to have a sheet at the rear thereof, and said registering devices adapted to be manipulated to record upon said sheet the amounts and items delivered.

6. In a system for indicating orders and recording deliveries, a board having columns of items thereon, registering devices indicating amounts opposite each of said items, covers concealing said devices normally, certain of said devices being uncovered to indicate items and amounts ordered, the rear of said board adapted to lock a sheet, and said registering devices adapted to be operated to record upon said sheet the items and amounts delivered.

7. In a system for indicating orders and recording deliveries, a board having columns of items thereon, registering buttons indicating amounts opposite each of said items, said buttons being normally covered, certain of said buttons being uncovered to indicate items and amounts ordered, the rear of said board adapted to have a locked sheet, and said registering buttons adapted to be pressed to record upon said sheet the items and amounts delivered.

8. A system of the class described having a board, a list of items of goods thereon, registering devices representing amounts for each of said items, said board adapted to have a sheet adjacent thereto, and said registering devices adapted to be manipulated separately to record upon said sheet the items and amounts of said goods delivered.

9. In a system for indicating orders and recording deliveries, a board having columns of items of various goods supplied by various merchants, registering devices for each of said items representing amounts thereof, means indicating amounts of goods ordered, said board adapted to have a facsimile sheet at the rear thereof, and said registering devices adapted to be manipulated separately to record upon said sheet the items and amounts of various goods delivered by the various merchants.

10. In a system for indicating orders and recording deliveries, a board having a list of items of various goods to be ordered of the merchant, a list of items ordered to be left on deliverer's second trip, registering devices opposite said items representing amounts thereof, means for indicating amounts of goods ordered, said board adapted to have a facsimile sheet at the rear thereof, and said registering devices adapted to be manipulated separately to record upon said sheet all items and amounts of various goods delivered.

Signed at the city of New York, in the county of New York and State of New York, this 28th day of March, A. D. 1912.

WILLIAM HENRY BELL, JUNIOR.

Witnesses:
M. LEVY,
B. ROMAN.

Copies of this patent may be obtained for five cents each, by addressing the "Commissioner of Patents, Washington, D. C."